(12) United States Patent
Fatemi et al.

(10) Patent No.: US 11,876,409 B2
(45) Date of Patent: Jan. 16, 2024

(54) REINFORCED ROTOR FOR AN ELECTRIC MACHINE

(71) Applicant: GM Global Technology Operations LLC, Detroit, MI (US)

(72) Inventors: Alireza Fatemi, Canton, MI (US); Anthony Michael Coppola, Rochester Hills, MI (US); Derek Frei Lahr, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 17/376,334

(22) Filed: Jul. 15, 2021

(65) Prior Publication Data

US 2023/0018286 A1    Jan. 19, 2023

(51) Int. Cl.
| | | |
|---|---|---|
| *H02K 1/28* | (2006.01) | |
| *H02K 1/27* | (2022.01) | |
| *H02K 1/04* | (2006.01) | |
| *H02K 15/12* | (2006.01) | |
| *H02K 15/03* | (2006.01) | |
| *H02K 1/276* | (2022.01) | |

(52) U.S. Cl.
CPC .................. *H02K 1/28* (2013.01); *H02K 1/04* (2013.01); *H02K 1/276* (2013.01); *H02K 15/03* (2013.01); *H02K 15/12* (2013.01)

(58) Field of Classification Search
CPC ............ H02K 1/28; H02K 1/04; H02K 1/276; H02K 15/03; H02K 15/12; H02K 1/2766
See application file for complete search history.

(56) References Cited

U.S. PATENT DOCUMENTS

| | | | |
|---|---|---|---|
| 10,666,099 B1 | 5/2020 | Fatemi et al. | |
| 10,923,969 B2 | 2/2021 | Fatemi et al. | |
| 2005/0285468 A1 | 12/2005 | Fukushima et al. | |
| 2012/0169158 A1 | 7/2012 | Buettner et al. | |
| 2013/0162063 A1* | 6/2013 | Sasajima | H02K 1/27 264/261 |
| 2014/0368082 A1* | 12/2014 | Barton | H02K 15/165 29/598 |
| 2015/0145366 A1 | 5/2015 | Akashi et al. | |
| 2015/0180307 A1* | 6/2015 | Inuzuka | B25F 5/008 310/50 |
| 2019/0173337 A1* | 6/2019 | Shimokawa | H02K 15/03 |
| 2023/0017309 A1* | 1/2023 | Fatemi | H02K 1/32 |
| 2023/0018618 A1 | 1/2023 | Fatemi et al. | |

* cited by examiner

*Primary Examiner* — Thomas Truong
(74) *Attorney, Agent, or Firm* — CANTOR COLBURN LLP

(57) ABSTRACT

A rotor for an electric machine includes a rotor body formed from a plurality of rotor laminations defining a first axial end and a second axial end. Each of the plurality of rotor laminations includes a plurality of openings that are aligned so as to define a plurality of passages through the rotor body. A plurality of reinforcement elements extend through the plurality of laminations. Each of the plurality of reinforcement elements is arranged in a corresponding one of the plurality of passages and includes a first end portion and a second end portion. The first end portion and the second end portion of select ones of the plurality of reinforcement elements extend outwardly of the first axial end and the second axial end. An end ring is positioned at the first axial end. The end ring is integrally formed with the select ones of the plurality of reinforcement elements.

13 Claims, 4 Drawing Sheets

REINFORCED ROTOR FOR AN ELECTRIC MACHINE

INTRODUCTION

The subject disclosure relates to the art of electric machines and, more particularly, to a reinforced rotor for an electric machine.

Rotors are typically formed from multiple stacked laminations that support a central hub and a plurality of magnets. Generally, each lamination includes multiple openings that create webs and which serve as cooling passages, magnet mounting locations and the like. Openings are also located or positioned to reduce a weight of the rotor. The webs act as flux leakage paths which can reduce performance or increase operational costs of the electric machine.

Magnets are often inserted into the openings and held in place with an adhesive, such as an epoxy. In such cases, the openings will often include corrugated edges that retain the magnets and enhance retention of the epoxy. In many cases, the epoxy does not bond to the magnets and simply serves as, for example, a wedge that prevents the magnets from moving. Magnet retention, flux leakage, and structural support are issues that may limit an overall operating speed of the rotor. Accordingly, it would be desirable to provide a rotor with structural support that can stabilize the magnets, reduce flux leakage, and enhance stiffness so that the rotor may accommodate high speed operation.

SUMMARY

Disclosed is a rotor for an electric machine including a rotor body formed from a plurality of stacked laminations defining a first axial end and an opposing second axial end. Each of the plurality of stacked laminations includes a plurality of openings that are aligned so as to define a plurality of passages through the rotor body. A plurality of reinforcement elements extend through the plurality of stacked laminations. Each of the plurality of reinforcement elements is arranged in a corresponding one of the plurality of passages and includes a first end portion and a second end portion. The first end portion and the second end portion of select ones of the plurality of reinforcement elements extend outwardly of the first axial end and the second axial end. An end ring is positioned at the first axial end. The end ring is integrally formed with the select ones of the plurality of reinforcement elements.

In addition to one or more of the features described herein another end ring is positioned at the second axial end, the another end ring being integrally formed with the select ones of the plurality of reinforcement elements.

In addition to one or more of the features described herein the end ring, the another end ring, and the plurality of reinforcement elements are formed from a polymer composite.

In addition to one or more of the features described herein the polymer composite includes at least one of an epoxy, a polymer, polyimide, acrylate, silicone, Polyetheretherketone (PEEK), polyetherketone (PEK), a polyamide, and a bismaleimide.

In addition to one or more of the features described herein a first reinforcement member is mounted to the end ring.

In addition to one or more of the features described herein a second reinforcement member is mounted to the another end ring.

In addition to one or more of the features described herein the first and second reinforcement elements are formed from a metal.

In addition to one or more of the features described herein the plurality of reinforcement elements includes a first plurality of reinforcement elements extending from the first axial end to a center of the rotor body and a second plurality of reinforcement elements extending from the second axial end toward the center of the rotor body.

In addition to one or more of the features described herein each of the first plurality of reinforcement elements includes a first end section that extends outwardly of the first axial end and a second end section that terminates in the rotor body.

In addition to one or more of the features described herein each of the second plurality of reinforcement elements includes a third end section that extends outwardly of the second axial end and a fourth end section that terminates in the rotor body, the second end section being spaced from the fourth end section within the rotor body.

In addition to one or more of the features described herein the select ones of the plurality of reinforcement elements includes all of the reinforcement elements.

Also disclosed is a method of forming a reinforced rotor includes molding a rotor end ring and a plurality of reinforcement elements as an integrated component, supporting a plurality of rotor laminations forming a rotor body at a first axial end with the rotor end ring, and internally supporting the plurality of rotor laminations with the plurality of reinforcement elements.

In addition to one or more of the features described herein molding the plurality of reinforcement elements includes introducing a reinforcement element medium into a plurality of passages formed in a rotor body.

In addition to one or more of the features described herein molding another rotor end ring with the rotor end ring and the plurality or reinforcement elements as an integrated member.

In addition to one or more of the features described herein molding the rotor end ring and the another rotor end ring includes molding the rotor end ring and the another rotor end ring directly on the rotor body.

In addition to one or more of the features described herein internally supporting the plurality of rotor laminations includes inserting the plurality of reinforcement elements into passages formed in the rotor body at the first axial end.

In addition to one or more of the features described herein inserting another plurality of reinforcement elements integrally molded with the another rotor end ring into the passages formed in the rotor body at a second axial end.

In addition to one or more of the features described herein installing a rotor end ring reinforcement member onto the rotor end ring.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
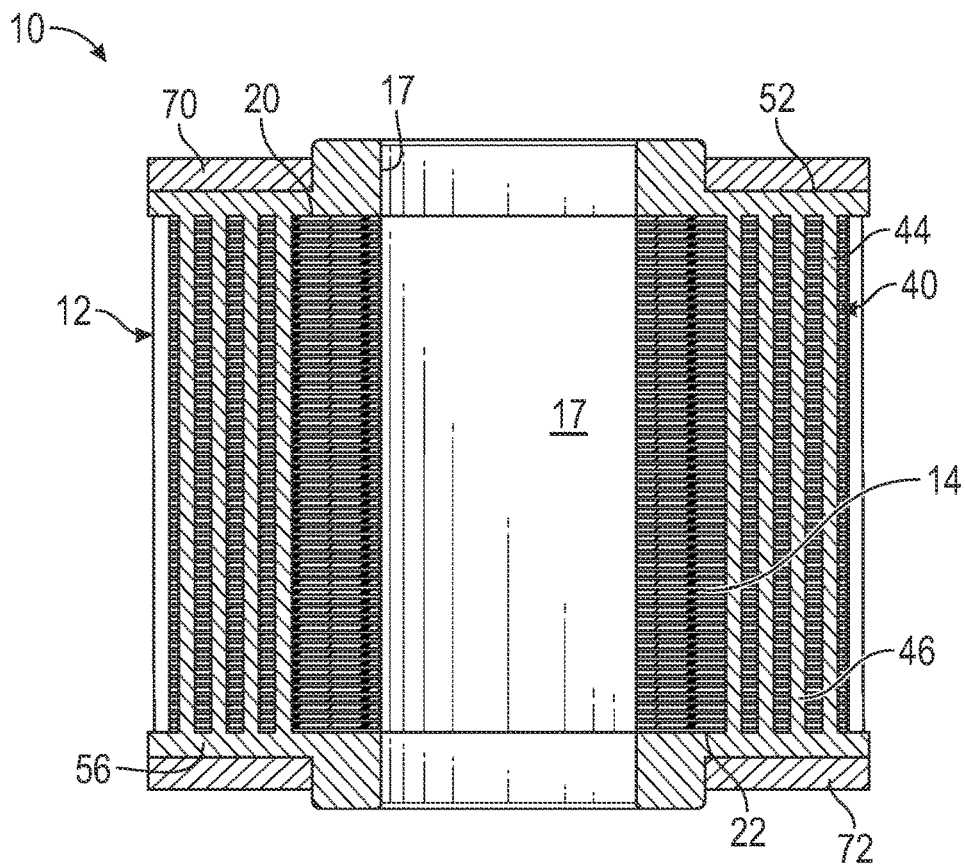
FIG. 1 is a cross-sectional side view of a rotor including reinforcement elements and rotor end rings taken along the line 1-1 in FIG. 2, in accordance with a non-limiting example.
Figure 2:
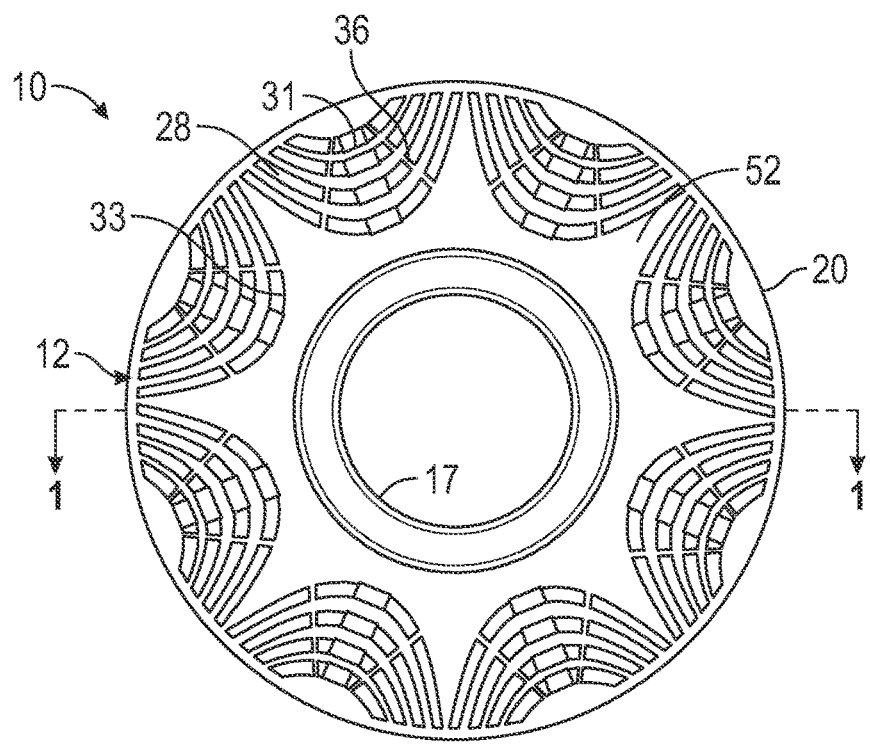
FIG. 2 is an axial end view of the rotor of FIG. 1 without a reinforcement member, in accordance with a non-limiting example.

A rotor, in accordance with a non-limiting example, is indicated at 10 in FIGS. 1 and 2. Rotor 10 includes a body 12 formed from a plurality of stacked laminations 14 defining a central opening 17. Central opening 17 supports a shaft and/or bearings (not shown) that facilitate rotation of rotor 10 within a stator (also not shown). Body 12 includes a first axial end 20 and an opposing second axial end 22. A plurality of openings, one of which is indicated at 28 is formed in each of the plurality of stacked laminations 14. Openings 28 align one, with another, to define a plurality of magnet receiving passages 31 and a plurality or reinforcement element passages 33. Select ones of openings 28 are connected through bridges 36 so as to provide structural support for rotor 10.

Figure 3:
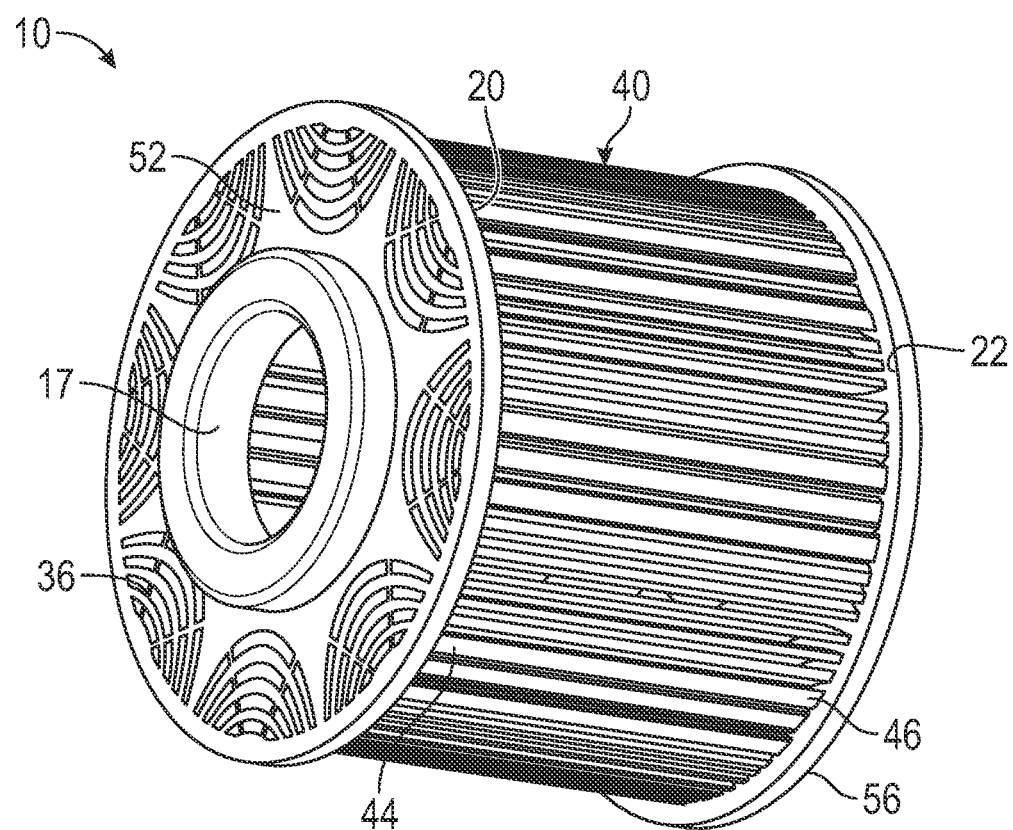
FIG. 3 depicts a perspective view of first and second rotor end rings formed with a plurality of reinforcement elements without the rotor laminations, in accordance with a non-limiting example.

In accordance with a non-limiting example, a plurality of reinforcement elements, one of which is indicated at 40 extend though corresponding ones of the plurality of reinforcement element passages 33. Each of the plurality of reinforcement elements 40 includes a first end portion 44 and a second end portion 46. In a non-limiting example, a first rotor end ring 52 is provided at first axial end 20 and a second rotor end ring 56 is provided at second axial end 22. First rotor end ring 52 and second rotor end ring 56 are integrally formed with reinforcement elements 40. In a non-limiting example depicted in FIG. 3, first rotor end ring 52 is molded together with first end portion 44 and second rotor end ring 56 is molded together with second end portion 46 of the plurality of reinforcement elements 40.

In a non-limiting example, first rotor end ring 52, second rotor end ring 56, and the plurality of reinforcement elements 40 may be formed from various materials. In accordance with a non-limiting example, first rotor end ring 52, second rotor end ring 56, and the plurality of reinforcement elements 40 may be made from non-magnetic, non-electrically conductive materials that may be molded such as various polymers and polymer composites. In accordance with another non-limiting example, first rotor end ring 52, second rotor end ring 56, and the plurality of reinforcement elements 40 may be formed from one of an epoxy, a polymer, polyimide, acrylate, silicone, Polyetheretherketone (PEEK), polyetherketone (PEK), a polyamide, and a bismaleimide.

In a non-limiting example, a first reinforcement member 70 may be mounted on first rotor end ring 52 and a second reinforcement member 72 may be mounted on second rotor end ring 56. First and second reinforcement members 70 and 72 may be added so as to provide additional structural support and to facilitate balancing of rotor 10. In a non-limiting example, first reinforcement member 70 and second reinforcement member 72 may be formed from one of steel, aluminum, or other material, including metal and non-metal materials and alloys.

In a non-limiting example, reinforcement elements 40, first rotor end ring 52 and second rotor end ring 56 may be formed using a variety of processes. For example, reinforcement elements 40, first rotor end ring 52 and second rotor end ring 56 may be formed directly in body 12. In a non-limiting example, reinforcement element passages 33 may act as a mold that receives material to form reinforcement elements 40. The material may be introduced into each reinforcement element passage 33 and a first mold (not shown) may be provided at first axial end 20 and a second mold (also not shown) may be provided at second axial end 22. Material may be introduced into the first mold, flow through reinforcement element passages 33 to the second mold and allowed to cool. During cooling, a compressive force may be applied to the plurality of rotor laminations 14. In another non-limiting example, reinforcement elements 40, first rotor end ring 52 and second rotor end ring 56 may be formed outside of body 12 and installed.

In a non-limiting example, a first amount of the plurality of laminations 14 may be aligned and formed into a first stack (not separately labeled). A first plurality of magnets (also not separately labeled) may then be inserted into corresponding ones of magnet receiving passages 31. A second amount of the plurality of laminations 14 may be aligned and formed into a second stack. (not separately labeled). A second plurality of magnets (not separately labeled) may be inserted into corresponding ones of the magnet receiving passages in the second stack. The second stack may then be positioned on and aligned with the first stack. The number of stacks may vary.

Figure 4:
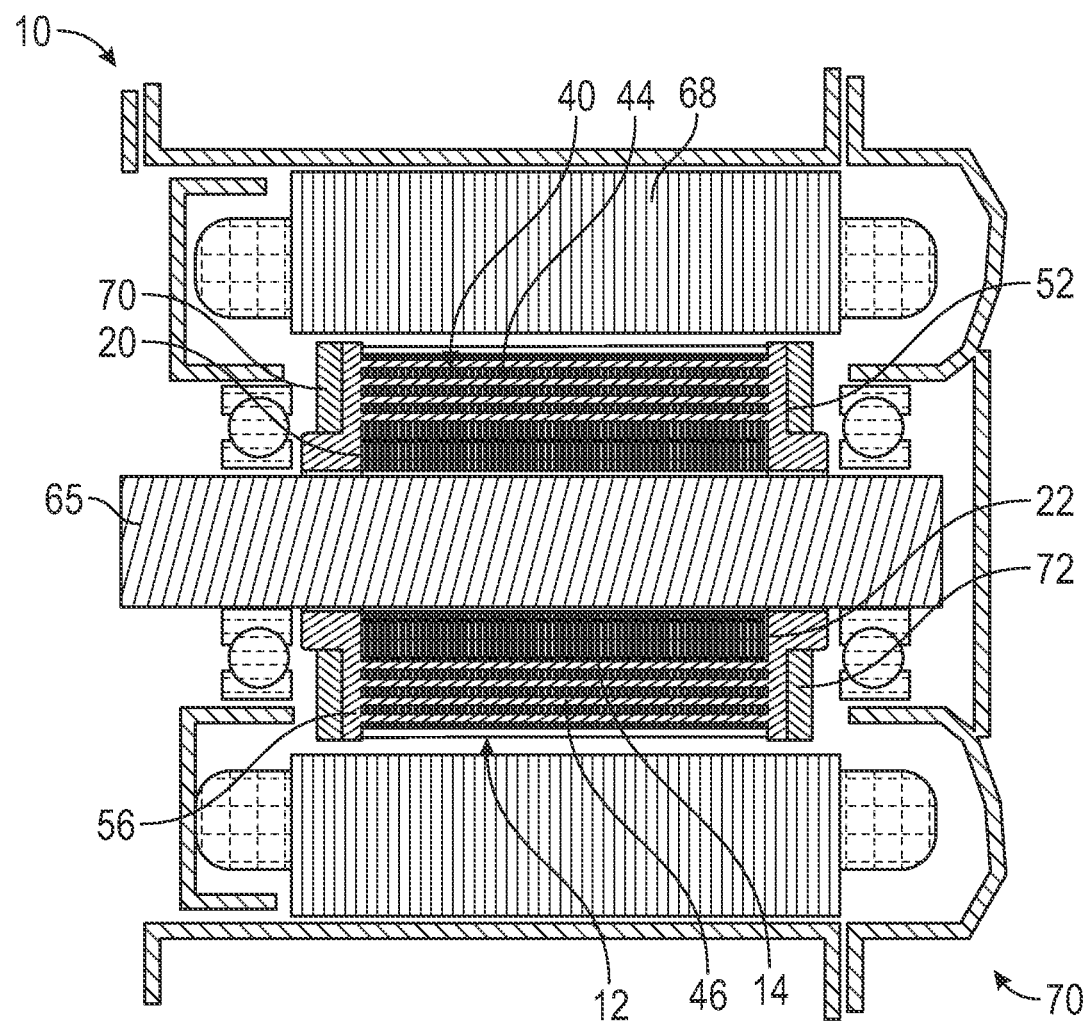
FIG. 4 depicts a cross-sectional side view of an electric machine including the rotor of FIG. 1, in accordance with a non-limiting example.

At this point, plurality of reinforcement elements 40 may be installed through the first and second stacks. Once all stacks are formed, aligned, and reinforcement elements 40 added, first end ring 52 and second end ring 56 may be installed as described herein. Referring to FIG. 4, rotor 10 may then receive a shaft 65 and be balanced as necessary before being installed within a stator 68 of an electric machine 70.

Figure 5:
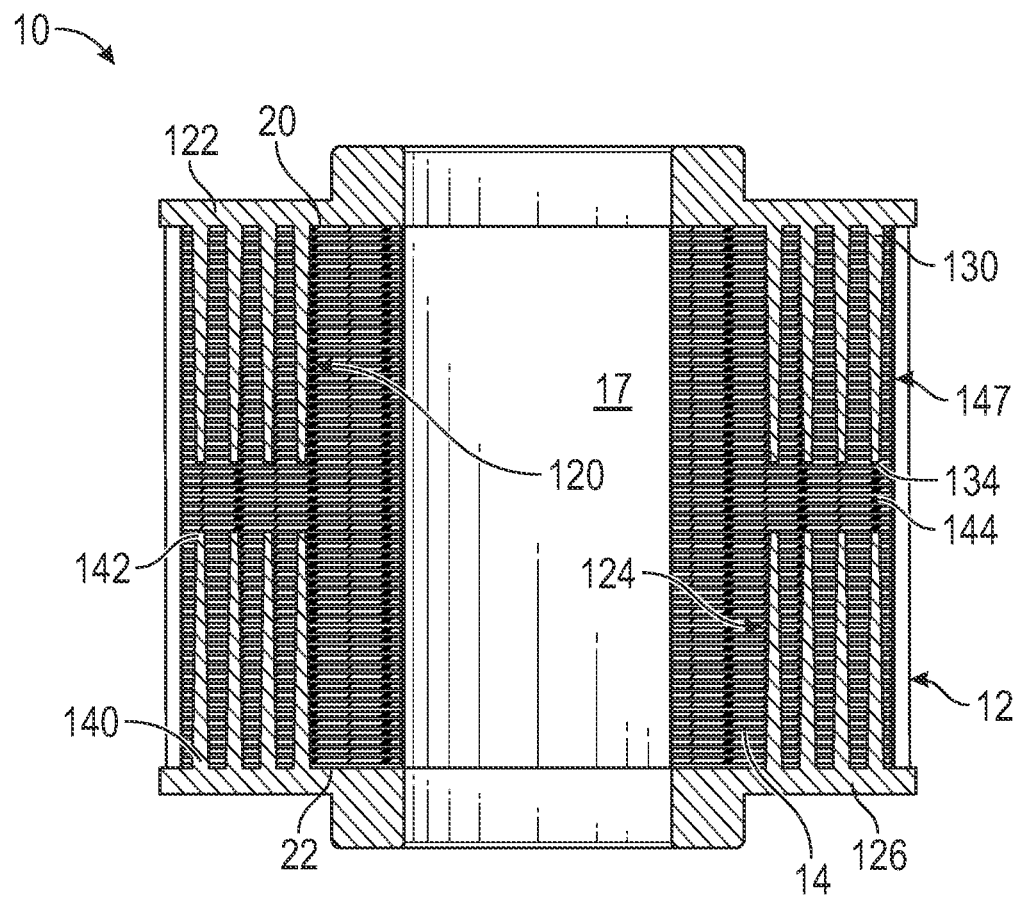
FIG. 5 depicts integrated rotor end rings and reinforcement, in accordance with a non-limiting example.

FIG. 5 depicts a rotor 10 in accordance with another non-limiting example including a first plurality of reinforcement elements 120 extending into body 12 from a first rotor end ring 122 positioned at first axial end 20 and a second plurality of reinforcement elements 124 extending into body 12 from a second rotor end ring 126 positioned at second axial end 22. First plurality of reinforcement elements 120 includes a first end section 130 extending from and formed with first rotor end ring 52 and a second end section 134 that terminate within body 12. Similarly, second plurality of reinforcement elements 124 includes a third end section 140 extending from and formed with second rotor end ring 56 and a fourth end section 142 that terminate within body 12. Second end section 134 of the first plurality of reinforcement elements 120 may be spaced from fourth end section 142 of the second plurality of reinforcement elements 124 by a gap 144 defined by laminations 14.

In a non-limiting example, first plurality of reinforcement elements 120 include a tapered profile 147. Similarly, plurality of rotor laminations 14 include passages (not separately labeled) having a taper. In a non-limiting example, first end section 130 may have a dimension that is greater than second end section 134. Second plurality of reinforcement elements 124 may be substantially similarly formed. In this manner, additional reinforcement may be provided at first and second axial ends 20 and 22 respectively. Further, the taper allow laminations toward a center portion (not separately labeled) of body 12 to have webs and bridges having a first thickness, and laminations further axially outwardly to have thinner webs and bridges.

At this point, it should be understood that the non-limiting examples described herein provide internal reinforcement elements formed with first and second rotor end rings in a rotor that add structural support allowing bridges to be removed and or reduced from rotor laminations and reduce sources of internal magnetic flux leakage. The internal reinforcement also supports rotor magnets to reduce strain on epoxy and/or other adhesives used for attachment. In this manner, the rotor may be operated at higher speeds without experiencing magnet failure or requiring hefty magnet support bridges in each lamination. Further, rotor end rings may be constructed to provide support for the reinforcement elements while also providing a mass reduction without losing rotor balancing capability.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A rotor for an electric machine comprising:
a rotor body formed from a plurality of stacked laminations defining a first axial end and an opposing second axial end, each of the plurality of stacked laminations including a plurality of openings that are aligned so as to define a plurality of passages through the rotor body;
a plurality of reinforcement elements extending through the plurality of stacked laminations, each of the plurality of reinforcement elements being arranged in a corresponding one of the plurality of passages and including a first end portion and a second end portion;
a first rotor end ring positioned at the first axial end of the rotor body, the first rotor end ring being formed with select ones of the plurality of reinforcement elements, the plurality reinforcement elements being circumferentially spaced from another about the rotor body and radially spaced from one another across the rotor body; and
a second rotor end ring positioned at the second axial end of the rotor body, the second rotor end ring being formed with other select ones of the plurality of reinforcement elements, wherein the first rotor end ring and the select ones of the plurality of reinforcement elements form a monolithic structure and the second rotor end ring and the other select ones of the plurality of reinforcement elements form another monolithic structure.

2. The rotor according to claim 1, wherein the first rotor end ring, the second rotor end ring, and the plurality of reinforcement elements are formed from a polymer composite.

3. The rotor according to claim 2, wherein the polymer composite includes at least one of an epoxy, a polymer, polyimide, acrylate, silicone, Polyetheretherketone (PEEK), polyetherketone (PEK), a polyamide, and a bismaleimide.

4. The rotor according to claim 1, further comprising:
a first reinforcement member mounted to the first rotor end ring.

5. The rotor according to claim 4, further comprising:
a second reinforcement member mounted to the second rotor end ring.

6. The rotor according to claim 5, wherein the first and second reinforcement members are formed from a metal.

7. The rotor according to claim 1, wherein the select ones of the plurality of reinforcement elements includes a first plurality of reinforcement elements extending from the first rotor end ring into the rotor body and the other select ones of the plurality of reinforcement elements includes a second plurality of reinforcement elements extending from the second rotor end ring into the rotor body.

8. The rotor according to claim 7, wherein each of the first plurality of reinforcement elements includes a first end section formed with the first end ring at the first axial end and a second end section that terminates within the rotor body.

9. The rotor according to claim 8, wherein each of the second plurality of reinforcement elements includes a third end section formed with the second end ring at the second axial end and a fourth end section that terminates within the rotor body, the second end section being spaced from the fourth end section within the rotor body.

10. The rotor according to claim 1, wherein the select ones of the plurality of reinforcement elements and the other select ones of the plurality of reinforcement elements includes all of the plurality of reinforcement elements.

11. The rotor according to claim 1, wherein the select ones of the plurality of reinforcement elements taper from the first rotor end ring towards the second rotor end ring, and the other of the select ones of the plurality of reinforcement elements taper from the second end ring towards the first end ring.

12. An electric machine comprising:
a stator; and
a rotor rotatable arranged within the stator, the rotor comprising:
a rotor body formed from a plurality of stacked laminations defining a first axial end and an opposing second axial end, each of the plurality of stacked laminations including a plurality of openings that are aligned so as to define a plurality of passages through the rotor body;
a plurality of reinforcement elements extending through the plurality of stacked laminations, each of the plurality of reinforcement elements being arranged in a corresponding one of the plurality of passages and including a first end portion and a second end portion;
a first rotor end ring positioned at the first axial end of the rotor body, the first rotor end ring being formed with select ones of the plurality of reinforcement elements, the plurality reinforcement elements being circumferentially spaced from another about the rotor body and radially spaced from one another across the rotor body; and
a second rotor end ring positioned at the second axial end of the rotor body, the second rotor end ring being formed with other select ones of the plurality of reinforcement elements, wherein the first rotor end ring and the select ones of the plurality of reinforcement elements form a monolithic structure and the second rotor end ring and the other select ones of the plurality of reinforcement elements form another monolithic structure.

13. The electric machine according to claim 12, wherein the select ones of the plurality of reinforcement elements taper from the first rotor end ring towards the second rotor end ring, and the other of the select ones of the plurality of reinforcement elements taper from the second end ring towards the first end ring.

\* \* \* \* \*